Nov. 11, 1969   R. S. SEGSWORTH   3,478,155
INDUCTION HEATING

Filed July 11, 1966   2 Sheets-Sheet 1

INVENTOR.
R. Sidney Segsworth
BY
J. H. Slough
J. H. SLOUGH
ATTORNEY

United States Patent Office 3,478,155
Patented Nov. 11, 1969

3,478,155
INDUCTION HEATING
Robert Sidney Segsworth, Warren, Ohio, assignor to Ajax Magnethermic Corporation, Warren, Ohio, a corporation of Ohio
Filed July 11, 1966, Ser. No. 564,281
Int. Cl. H05b 5/00, 1/06
U.S. Cl. 13—26
9 Claims

ABSTRACT OF THE DISCLOSURE

In induction heating and melting furnaces wherein the load is variable, a polyphase source of low frequency alternating current, electronic switching devices connected in series with a supply line and interposed between the supply and the load, the switching devices being switched to control the power delivered to the load to match the changing characteristics of the load.

---

The present invention relates to induction heating and melting and relates more particularly to new and improved means for regulating, controlling, and switching the electrical power delivered for use in induction heating furnaces, which means require no contactors, breakers, tap changers, motor generators, or the like. The invention may be used to heat metal for forging or heat-treating, etc., as well as for coreless and channel-type furnaces. More particularly, the invention relates to the use of electronic switching devices interposed between the supply and the load to accomplish highly desirable results not readily obtainable heretofore in a simple and efficient manner. By means of the electronic switching devices the conventional switches, tap changers, contactors, breakers, etc., are eliminated and on-off switching, modulation of power through a selected range is achieved, which might be from zero to maximum; further a single phase load may be distributed equitably into a three-phase supply system.

By use of the invention improved switching is achieved with instantaneous response and in a quiet, efficient manner.

The invention further effects important economics in manufacture and operation.

Although I have referred to the use in my invention of electronic switching devices and have illustrated the use of silicon controlled rectifiers for this purpose, I am aware that other electronic devices; such as, thyratons, ignitrons, and electric valves, may be substituted therefor. Therefore, whenever in the specification electronic switching devices are referred to, it is to be understood that any of the said electronic devices aforesaid are comprehended thereby.

The present invention, it will be noted, provides on-off switching to control power delivered to the load and without the use of moving parts, such as, contactors, breakers, tap changers, motor generators or other conventional means.

Figure 1:
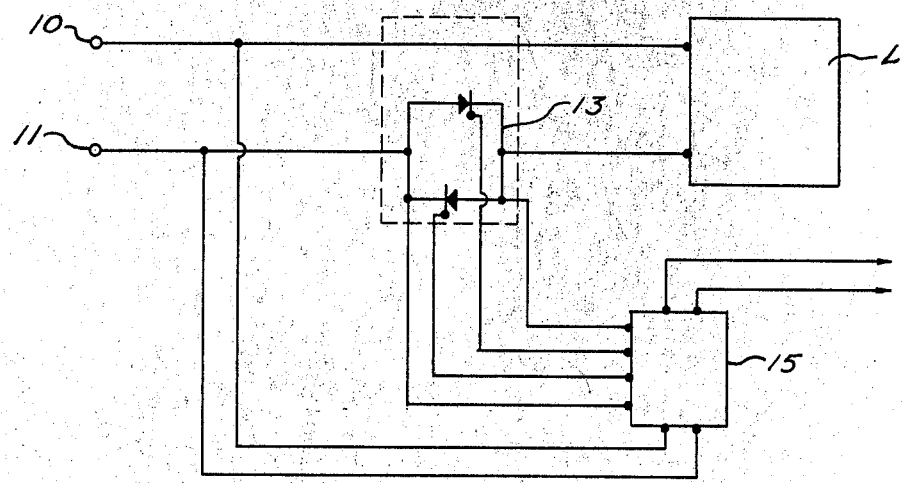
FIGURE 1 is a schematic view of the simplest modification of the invention.
Figure 3:
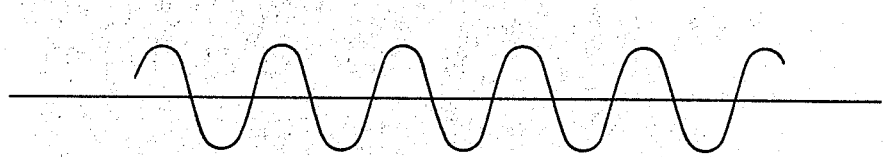
FIGURE 3 is a graph of the supply voltage.
Figure 4:
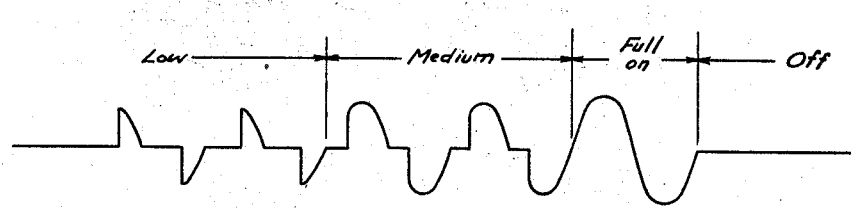
FIGURE 4 is a representation of the voltage applied to the load showing modifications of each cycle of the supply voltage according to the invention of FIGURES 1 and 2.
Figure 5:
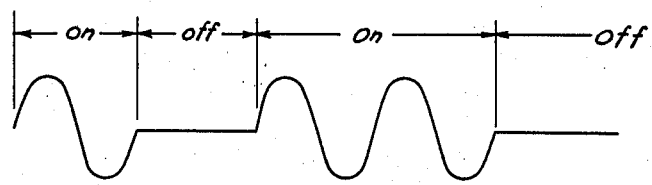
FIGURE 5 is a representation of voltages applied to the load with "on-off" modifications of a selected number of cycles of the supply voltage.

Reference is now made to the drawings and particularly the modification shown in FIGURE 1. It will be noted that a single phase supply is indicated, the supply terminals being shown at 10 and 11, to deliver power to a load indicated by L. A silicon controlled rectifier unit 13 is disposed in the circuit between the power source and the load. In the modification shown in FIGURE 1 a pulse supply and control unit is shown at 15 which is operated by manual or automatic control (not shown) and by appropriate design of the firing circuit included therein the power delivery to the load may be modulated either, (a) by permitting the supply power to be used during a selected portion of each cycle, as indicated in FIGURE 4; or, (b) alternatively, by permitting power to be used during a certain desired number of cycles and then disconnecting it for an appropriate number of cycles, as shown in FIGURE 5. The modulation by means of (a) is shown in the diagram of FIGURE 4; the alternative form of modulation (b) is shown in FIGURE 5.

Figure 2:
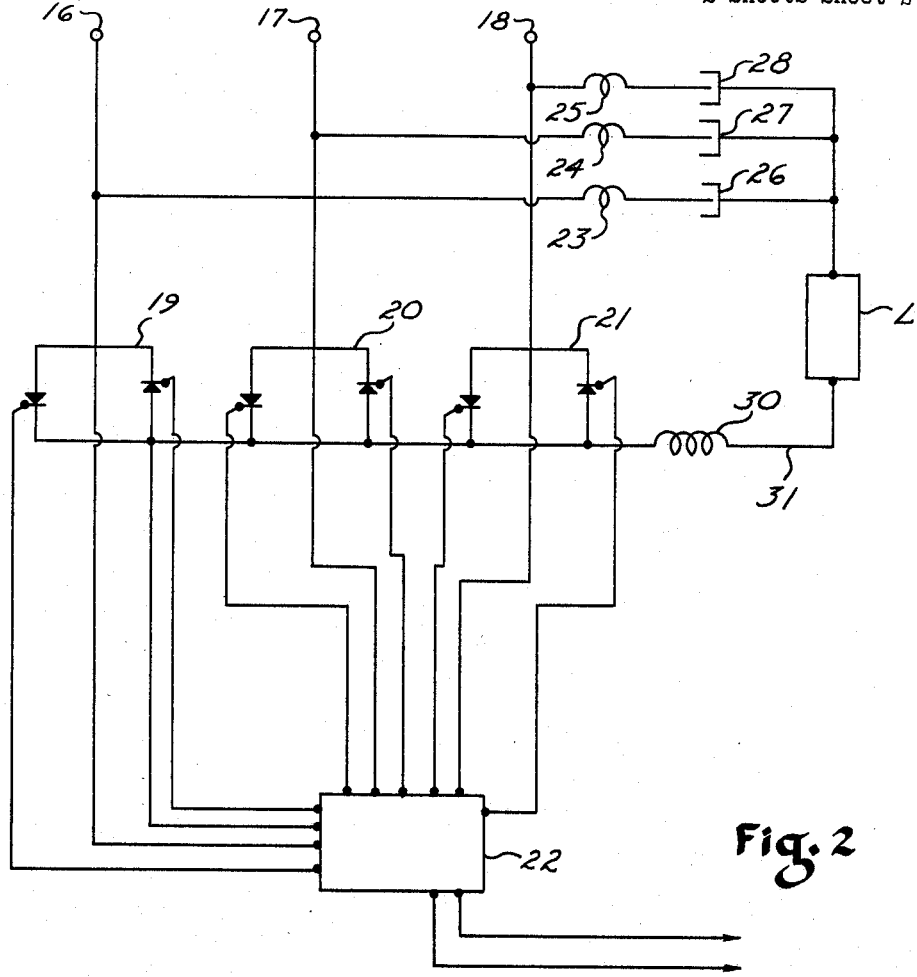
FIGURE 2 is a schematic view showing a single-phase load distributed into a three phase-supply.

In the form of my invention disclosed in FIGURE 2, a multi-phase supply and single-phase load is shown, the multi-phase supply terminals being indicated at 16, 17, 18 and the load being shown at L. Pairs of solid state switching devices, as silicon controlled rectifiers, 19, 20, 21 are shown connected back to back interpose in each line of the supply, and a pulse supply and control unit 22 is shown which may be connected to automatic or manual control means, as in the form of FIGURE 1; said unit 22 operates the switching devices 19, 20, 21 shown in FIGURE 2. Reactors or linear chokes 23, 24, 25, and capacitors 26, 27, 28 are shown interposed in each phase of the supply circuit between the supply terminals and the load. Reactor 30 is interposed in a commonn connnection 31 disposed between the load and the electronic switching devices.

In the disclosure of FIGURE 2 a three-phase alternating current supply is delivered to a single-phase load and the single-phase load is equitably distributed into said three-phase supply. This arrangement will also provide on-off switching and modulation control.

Although I have disclosed my invention in connection with certain preferred embodiments, I am aware that various departures may be made therefrom without, however, departing from the spirit of my invention or the scope of the appended claims.

What I claim is:

1. In induction heating and melting furnaces wherein the load is variable, a polyphase source of low frequency alternating current, electronic switching devices to control alternating current (single phase) power delivered to the furnace, said devices connected in series with a supply line and interposed between the supply and the furnace, the said controlling electronic switching devices providing contnrolled switching between the power source and the furnace to control the power delivered to the load to match the changing characteristics of the load.

2. In induction heating and melting furnaces wherein the load is variable, a single phase source of low frequency alternating current, electronic switching devices to control alternating current single phase power delivered to the furnace, said devices connected in series with a supply line and interposed between the supply and the furnace, the said controlling electronic switching devices providing controlled switching between the power source and the furnace to control the power delivered to the load to match the changing characteristics of the load providing on-off switching between the power source and the furnace whereby the alternating current source power delivered to the load is modulated.

3. In induction heating and melting furnaces wherein the load is variable, a single phase source of low frequency alternating current, electronic switching devices to control alternating current single phase power delivered to the furnace, said devices connected in series with a supply line and interposed between the supply and the furnace, the said controlling electronic switching devices providing controlled switching between the power source and the furnace to control the power delivered to the load to match the changing characteristics of the load providing on-off switching between the power source and the furnace whereby alternating current power delivered to the load is modulated and wherein the supply power is adapted to be used only during a selected portion of each cycle.

4. In induction heating and melting furnaces wherein the load is variable, a single phase source of low frequency alternating current, electronic switching devices to control alternating current single phase power delivered to the furnace, said devices connected in series with a supply line and interposed between the supply and the furnace, the said controlling electronic switching devices providing controlled switching between the power source and the furnace to control the power delivered to the load to match the changing characteristics of the load providing on-off switching between the power source and the furnace, alternating current power being delivered to the furnace, being modulated by permitting alternating current power to be used during a certain desired number of cycles and wherein the same is switched off for appropriate number of cycles.

5. In induction heating according to claim 1 wherein the said controlling electronic switching devices are connected in series in each line of the supply, a pulse supply and control unit is provided to operate the electronic switching devices, reactors and capacitors are interposed in each phase of the supply circuit between the source and the furnace.

6. In induction heating according to claim 1 wherein the said controlling electronic switching devices are interposed in each line of the supply, a pulse supply and control unit is provided to operate the electronic switching devices, reactors and capacitors are interposed in each phase of the supply circuit between the source and the furnace and a reactor is interposed in a common connection between the furnace and the electronic switching devices.

7. In induction heating according to claim 1 in which the said controlling electronic switching devices provide on-off switching between the power source and the furnace whereby the alternating current source power delivered to the load is modulated.

8. In induction heating according to claim 1 in which the said controlling electronic switching devices provide on-off switching between the power source and the furnace whereby alternating current power delivered to the load is modulated and wherein the supply power is adapted to be used only during a selected portion of each cycle.

9. In induction heating according to claim 1 in which the said controlling electronic switching devices provide on-off switching between the power source and the furnace whereby alternating current power delivered to the furnace is modulated by permitting said power to be used during a certain desired number of cycles and wherein the same is switched off for appropriate number of cycles.

References Cited
UNITED STATES PATENTS

| | | | |
|---|---|---|---|
| 2,521,880 | 9/1950 | Storm | 219—10.77 |
| 3,217,238 | 11/1965 | Suel | 315—196 X |
| 3,335,354 | 8/1967 | Rowan et al. | 307—252 X |
| 3,268,793 | 8/1966 | King et al. | 321—46 |
| 3,159,737 | 12/1964 | Dora | 219—501 |
| 3,235,711 | 2/1966 | Bergen et al. | 219—501 X |
| 3,332,036 | 7/1967 | Kappenhagen et al. | 219—10.75 X |
| 3,356,784 | 12/1967 | Bertioli et al. | 219—501 X |

JOSEPH V. TRUHE, Primary Examiner

L. H. BENDER, Assistant Examiner

U.S. Cl. X.R.

219—10.75, 501